United States Patent [19]

Spooner

[11] Patent Number: 4,890,541

[45] Date of Patent: Jan. 2, 1990

[54] FLUID-OPERATED ACTUATOR WITH FORCE MULTIPLICATION

[76] Inventor: Richard C. Spooner, Guilford Rd., Durham, Conn. 06422

[21] Appl. No.: 208,874

[22] Filed: Jun. 20, 1988

[51] Int. Cl.[4] .................................................. F16J 1/10

[52] U.S. Cl. .......................................... 92/84; 92/140; 74/110; 74/516; 269/32; 279/4

[58] Field of Search ...................... 92/84, 140; 74/110, 74/516; 269/32; 279/4

[56] References Cited

U.S. PATENT DOCUMENTS

| | | | |
|---|---|---|---|
| Re. 25,334 | 2/1963 | Michalak, Jr. | 92/84 X |
| 2,134,227 | 10/1938 | Forkardt | 92/140 |
| 3,042,289 | 7/1962 | Mikina | 92/84 X |
| 3,272,087 | 9/1966 | Culver | 92/84 X |
| 4,621,568 | 11/1986 | Gailey | 279/4 X |

FOREIGN PATENT DOCUMENTS

| | | | |
|---|---|---|---|
| 3137100 | 5/1982 | Fed. Rep. of Germany | 269/32 |
| 674860 | 7/1979 | U.S.S.R. | 269/32 |

*Primary Examiner*—Robert E. Garrett
*Assistant Examiner*—Mark A. Williamson
*Attorney, Agent, or Firm*—John H. Crozier

[57] ABSTRACT

A fluid-operated actuator for collets, vises, chucks and other workpiece engagement devices, for example, the actuator having a piston which moves the engagement device toward the workpiece with a force equal to product of the area of the face of the piston times the pressure of a fluid applied to the face. When the engagement device has engaged the workpiece, additional, relatively slight movement of the piston causes a force multiplying mechanism to provide increased engagement force without increasing the pressure of the actuating fluid. The overall travel of the actuator mechanism is not limited by the force-mulitplying mechanism which begins to function only after the unrelated distance of travel of the engagement device to the workpiece. Thus, for example, compressed air at ordinary shop pressures may be used to actuate collets or chucks on automatic lathes or the like to provide relatively high clamping forces.

13 Claims, 3 Drawing Sheets

FIG. 3
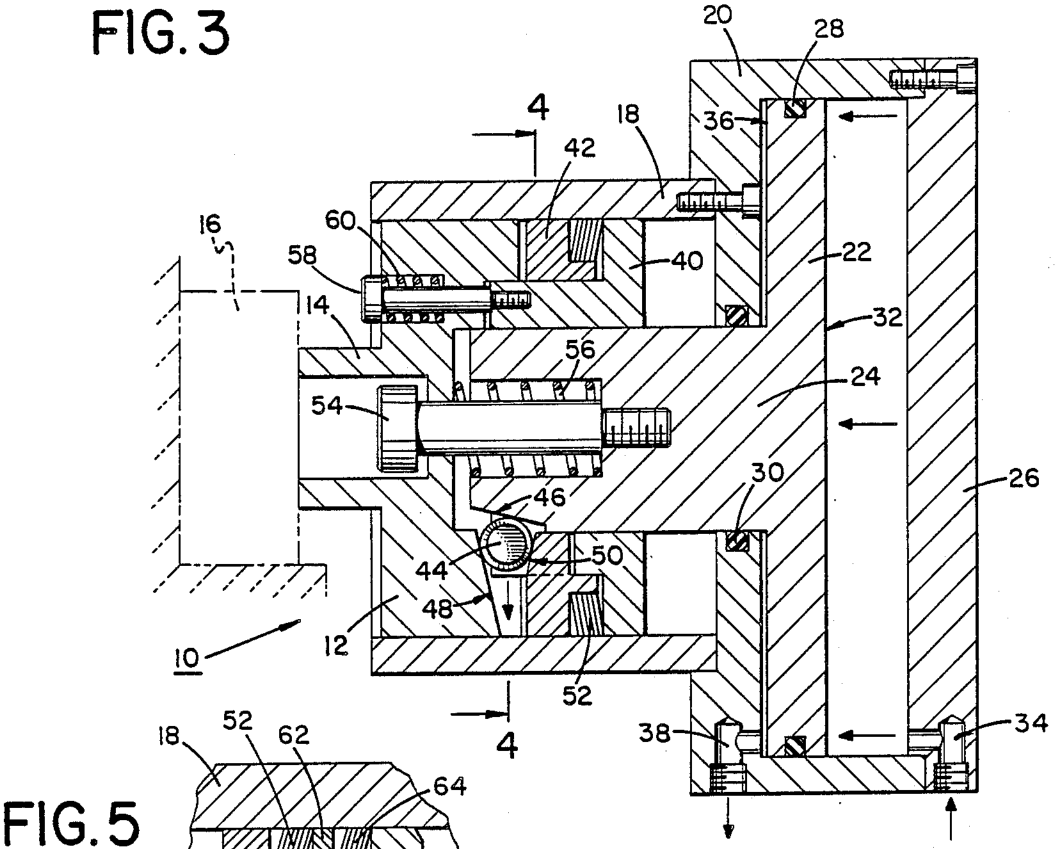
FIG. 5
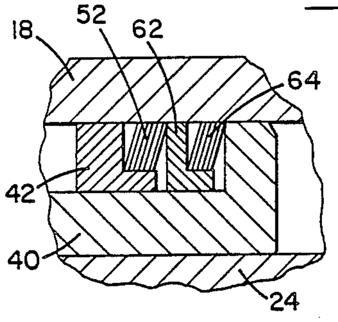
FIG. 6
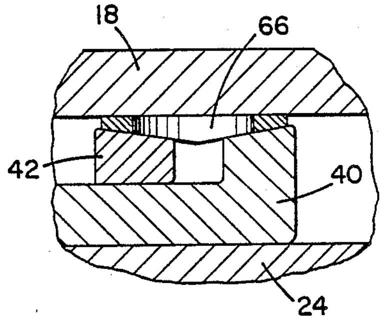
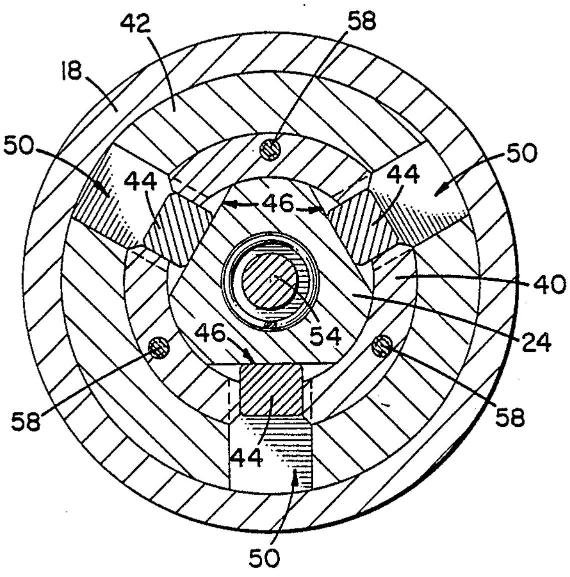
FIG. 4
FIG. 7
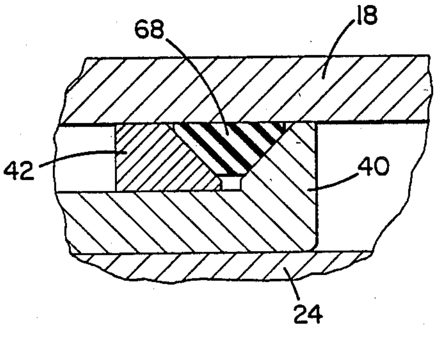

FLUID-OPERATED ACTUATOR WITH FORCE MULTIPLICATION

BACKGROUND OF THE INVENTION

1. Field of the Invention.

This invention relates to fluid-operated actuators generally and, more particularly, to a novel fluid-operated actuator which combines a relatively long actuating stroke with force multiplication.

2. Background Art.

While the present invention is described as being applied to the actuation of workpiece engagement means such as collets, vises, and chucks on machine tools and the like, it will be understood that it may be applied as well in any case where it is desired to provide a relatively long actuating stroke with force multiplication. Conventional chucks, collets, and actuators of the types described here are manufactured, for example, by Powerhold, Inc., Middlefield, Conn.

Collets and chucks on automatic lathes were originally moved between their open and clamped positions by linear motion provided by pneumatically-operated pistons which were supplied by pressurized air available in manufacturing plants, typically on the order of 80–85 pounds-per-square-inch pressure. The pistons provide movement of the clamping mechanism into contact with the workpiece and then provide the clamping force to grasp the workpiece. Relatively low force is required to move the clamping mechanism into contact with the workpiece, but it is usually desirable that relatively strong force be available for grasping the workpiece. Since the force developed by such a piston is equal to the product of the pressure of the air times the area of the piston, requirements for higher clamping forces required the use of larger diameter piston cylinders or the use of higher pressure air, if available. The larger diameters had practical and economical limits, so, eventually, hydraulically-actuated pistons came into use for applications requiring high clamping forces, with hydraulic units easily providing pressures of 1000 pounds per square inch or higher. That necessitated adding the relatively high cost of a hydraulic unit, but the same unit could also be used for actuating auxiliary attachments, such as tail stock aligners. That multiple use of the hydraulic unit helped spread its cost over a number of items.

Now that most such machines have their auxiliary attachments electrically actuated by computer control, it is necessary, in some cases, to provide a hydraulic unit solely for the actuation of the clamping mechanism, which means that the overall cost of the clamping mechanism is relatively high. It would thus be desirable to have a pneumatically-operated actuator of relatively small size that could produce the higher clamping pressures required.

While there are a number of mechanical devices known in the art which may be employed to multiply force, none is able to conveniently provide the relatively long linear stroke that is required to actuate such clamping mechanisms, which long stroke is easily provided by a piston.

Accordingly, it is a principal object of the present invention to provide a fluid-operated actuator that can provide a relatively large force when powered with compressed air.

A further object of the present invention is to provide such an actuator which can provide force multiplication combined with a relatively long linear stroke.

An additional object of the present invention is to provide such an actuator that is relatively small in diameter.

Other objects of the present invention, as well as particular features and advantages thereof, will, in part, be apparent and will, in part, be obvious from the following description and the accompanying drawing figures.

SUMMARY OF THE INVENTION

The present invention accomplishes the above objects, among others, by providing a fluid-operated actuator for workpiece engagement means, for example, the actuator having a piston which moves the engagement means toward the workpiece with a force equal to product of the area of the face of the piston times the pressure of a fluid applied to the face. When the engagement means has engaged the workpiece, additional, relatively slight movement of the piston causes force multiplying means to provide increased engagement force without increasing the pressure of the fluid supply. The overall travel of the actuator mechanism is not limited by the force-multiplying means which begins to function only after the unrelated distance of travel of the engagement means to the workpiece. Thus, for example, compressed air at ordinary shop pressures may be used to actuate collets or chucks on automatic lathes or the like to provide relatively high clamping forces.

BRIEF DESCRIPTION OF THE DRAWING

FIG. 3 shows the actuator of FIG. 1 in the position with force multiplication applied.

FIG. 4 shows a sectionalized view of the actuator of FIG. 1.

FIGS. 5–7 are details showing alternative embodiments of the locking means of the actuator of FIG. 1.

DETAILED DESCRIPTION OF THE PREFERRED EMBODIMENTS

Figure 1:
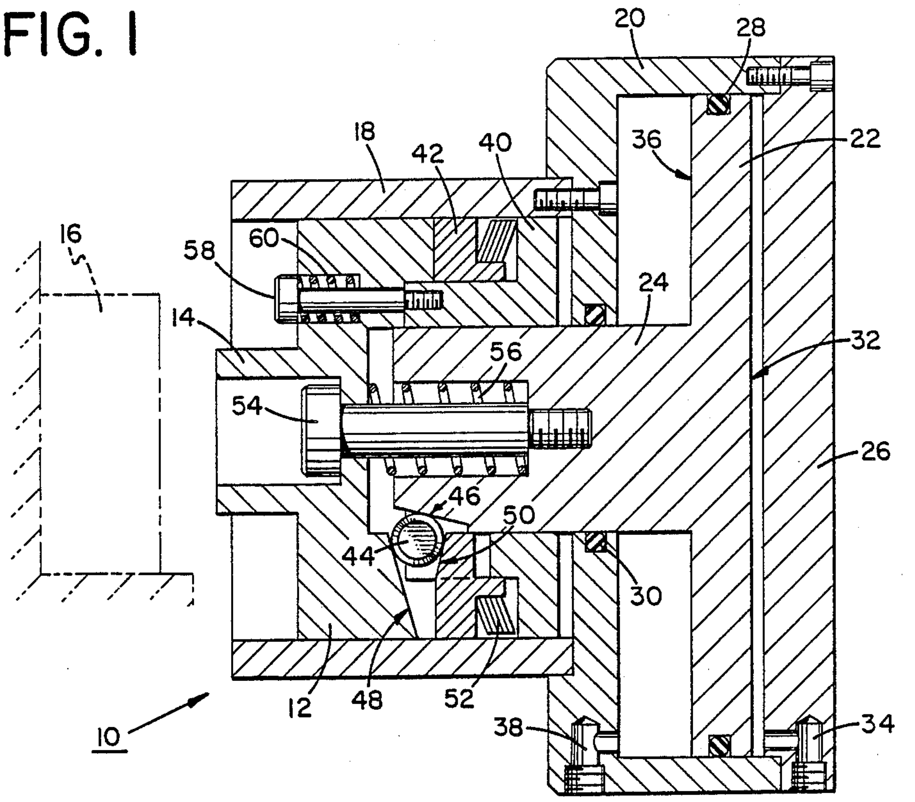
FIG. 1 is a side, cross-sectional elevation view of an actuator in its "open" position, constructed according to the present invention.
Figure 2:
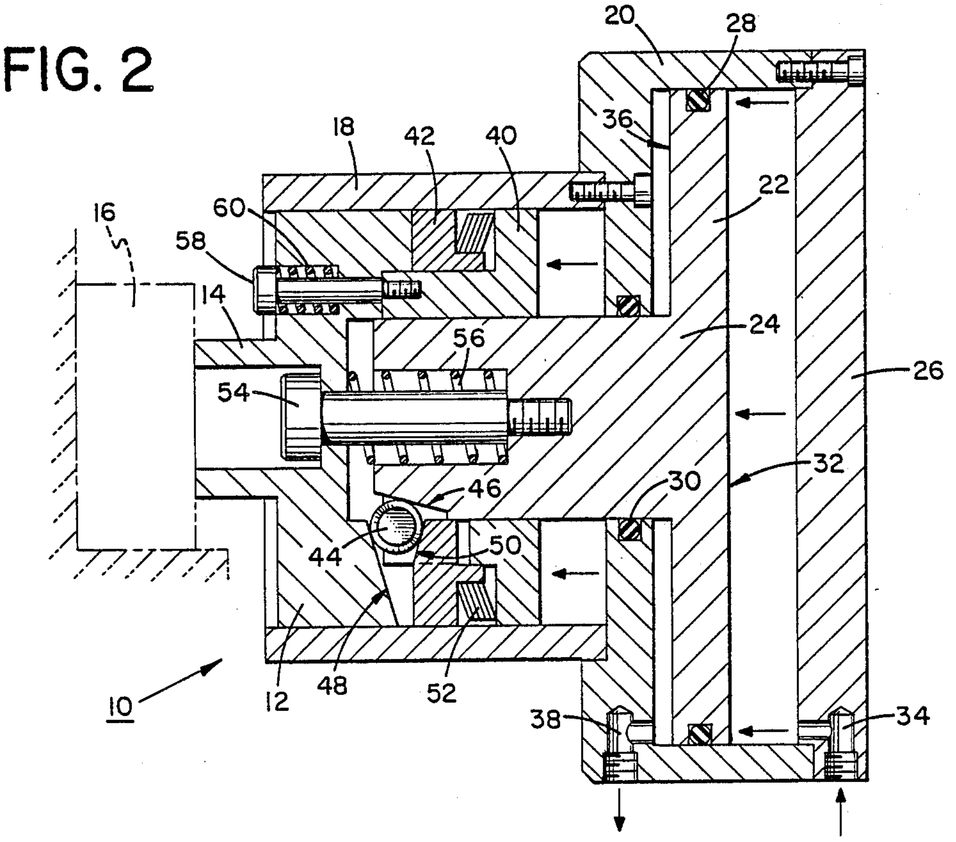
FIG. 2 shows the actuator of FIG. 1 in the position when a workpiece has just been engaged.

Referring now to the drawing, FIGS. 1–3 show an actuator, generally indicated by the reference numeral 10, which includes a clamping plunger 12 having a distal end 14 adapted for engagement with a workpiece 16. On FIG. 1, actuator 10 is in its "open" position, on FIG. 2, distal end 14 of clamping plunger 12 has moved to engage workpiece 16, and, on FIG. 3, the actuator is in its force-multiplication position. Reference to FIG. 4 will afford a greater understanding of arrangement of the force-multiplication mechanism.

Clamping plunger 12 is closely fitted for back-and-forth axial movement within a pilot cartridge 18 which is fixedly attached to a cylinder housing 20. Cylinder housing 20 is attached to a frame (not shown) which also supports workpiece 16 against relative motion with respect to actuator 10. Closely disposed within cylinder housing 20 is piston 22 adapted for back-and-forth axial movement within the cylinder housing. Integral with piston 20 is piston rod 24 which is disposed centrally of pilot cartridge 18 and which serves as an extension of piston 22. Cylinder housing 20 is sealed by cover 26 and sealing means 28 and 30, disposed as shown. Sealing means 28 and 30 may be O-rings, as shown, or may be any other type of sealing means known in the art, such as packing or piston rings. Fluid communication with the face side 32 of piston 22 is through port 34 and with the back side 36 of the piston is through port 38.

Completing the major elements of actuator 10 are: a cage 40, disposed for close-fitting independent axial movement relative to piston rod 24 and pilot cartridge 18; thrust ring 42, disposed for close-fitting independent axial movement relative to piston rod 24, pilot cartridge 18, and cage 40; rollers 44, disposed for engaging motion relative to sloped surfaces 46, 48, and 50, respectively, of piston rod 24, clamping plunger 12, and thrust ring 42, each pair of adjacent sloped surfaces defining a V-shaped trough; and locking cone-washers 52, disposed between cage 40 and thrust ring 42. While, theoretically, only one roller 44 need be employed, it is preferable that at least three such rollers be employed, disposed at 120-degree intervals about piston rod 24, for force equilibrium, as shown on FIG. 4. Locking cone-washers 52 may be of the type manufactured by Albrecht Maurer KG, Bad Homburg, West Germany, and marketed with the trademark RINGSPANN.

Shoulder screw 54 and its associated preloaded compression spring 56 are provided as shown to allow unitary movement of piston rod 24 and clamping plunger 12 while those element are moving from their positions shown on FIG. 1 to their positions shown on FIG. 2 and to allow relative axial movement between the piston rod and the clamping plunger for actuation of the force-multiplying means described below. At least one, and preferably at least three, shoulder screws 58 with their associated compression springs 60 are provided as shown to connect together clamping plunger 12 and cage 40 in abutting relationship, as shown on FIGS. 1 and 2, to allow their unitary movement together with thrust ring 42 and rollers 44, and to allow relative movement apart of the clamping plunger and the cage, as shown on FIG. 3.

In operation, the elements of actuator 10 are disposed as shown on FIG. 1, with distal end 14 of clamping plunger 12 spaced apart from workpiece 16. It may be assumed, for example, that an operation on a prior workpiece has been completed, that prior workpiece has been removed, and workpiece 16 has been moved into the position shown. Pressurized fluid (not shown) is introduced by suitable means known in the art (not shown), into cylinder housing 20 on face side 32 of piston 22 through port 34, while the pressure of any fluid in the cylinder housing on back side 36 of the piston is relieved through port 38. Preferably, compressed air is used as the actuating fluid, since it is readily available in most shops and is inexpensive, although the present invention is not limited to the use of compressed air. This causes the elements of actuator 10 which are held together by shoulder screw 54 and compression spring 56 to move unitarily toward workpiece 16, as indicated by the horizontal arrows on FIG. 2. The length of travel of the moving elements from the positions of FIG. 1 to the positions of FIG. 2 is, as a practical matter, essentially unlimited; but, typically, may range from a large fraction of an inch to a few inches.

After distal end 14 of clamping plunger 12 engages workpiece 16, as shown on FIG. 2, there is no further movement of the clamping plunger. Piston rod 24 is not so limited and may continue to move toward the work piece. This continued movement causes sloped surface 46 of piston rod 24 to urge rollers 44 toward the wall of pilot cartridge 18 in the direction indicated by the arrow adjacent roller 44 on FIG. 3. The resulting motion of roller 44 tends to force apart sloped surfaces 48 and 50, respectively, of clamping plunger 12 and thrust ring 42, thus providing rectilinear cam, or wedging, action with force multiplication. Axial movement of thrust ring 42 away from plunger 12 causes locking cone-washers 52 to compress toward a more perpendicular position relative to the wall of pilot cartridge 18. Since the outer circumferential peripheries of locking cone-washers 52 are retained stationary by the shoulder of cage 40, due to the preload of springs 60, the periphery of the locking cone-washers will engage and then wedge the inner wall of cartridge 18. Springs 60 are precompressed enough to provide preliminary gripping of locking cone-washers 52, but not enough to greatly reduce the force of clamping plunger 12 against the workpiece. The resulting cylinder lockout stops the axial movement of thrust ring 42 and the continuing wedging action of rollers 44 between slopes 46, 48, and 50 provides multiplied clamping force applied to workpiece 16. Due to the self-wedging capability of locking cone-washers 52, the axial force which retains thrust ring in place is proportional to the thrust applied to workpiece 16. This thrust is a multiple of the thrust that could be applied to workpiece 16 through piston 22 without the force multiplication action described above. In one such device constructed essentially as shown, the theoretical force multiplication factor is about 7.5 times; although, the actual multiplication factor achieved is about 4 to 5 times.

For most practical sizes of such actuators, the piston movement following engagement of workpiece 16 is on the order of a few ten-thousandths of an inch and this movement takes place only after the workpiece is engaged. Thus, the overall travel of the actuator mechanism is not limited by the force-multiplying means which begins to function only after the unrelated distance of travel to the workpiece.

The fluid applied to cylinder housing 20 may be any liquid or gas, of suitable pressure, which is compatible with the materials of construction of the "wetted" parts of the actuator. Preferably, the force-multiplying action of actuator 10 will permit the use of compressed air at the pressures ordinarily available in shop operations.

While rollers 44 have been shown as engaging sloped surfaces 46, 48, and 50 to provide the rectilinear cam, or wedging, action, it will be understood by those skilled in the art that shapes other than rollers may be employed as well. For example balls could be provided, in which case, sloped surfaces 46, 48, and 50 would desirably have corresponding rounded grooves formed therein. Also, those skilled in the art will be able to employ chucking levers or sprags or other wedging means and such is within the intent of the present invention.

Locking means other than as shown may also be employed within the intent of the present invention. For example, FIGS. 5–7 show such other means, with those figures, for convenient reference, identifying elements having the same functions as elements on FIGS.

1–3 with the same identifying numerals as on the former figures.

FIG. 5 shows the locking arrangement of FIGS. 1–3, but with a second thrust ring 62 and a second stack of locking cone-washers 64 disposed as shown between thrust ring 42 and cage 40. The arrangement of FIG. 5 provides about double the locking force at the same load as does the arrangement of FIGS. 1–3, with only one set of locking cone-washers.

FIG. 6 shows an alternative approach where the locking element is a slotted bushing 66 having internal diameter tapers.

In FIG. 7, the locking element is a resilient ring 68 which may be formed of rubber or a synthetic elastomeric material.

Figure 8:
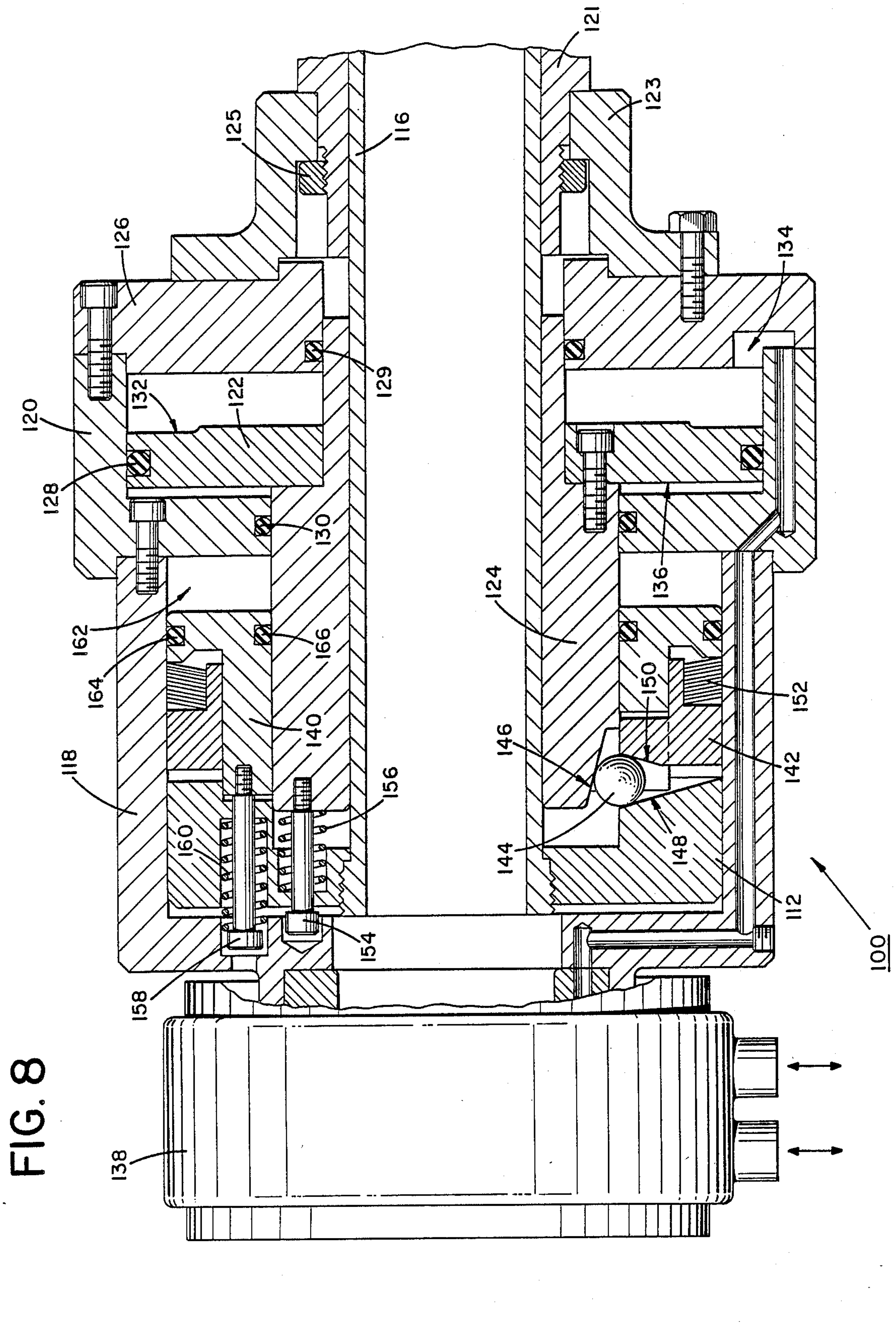
FIG. 8 is a side, cross-sectional elevation view of an actuator in its "closed" position, constructed according to the present invention, for use with machines having rotary spindles.

FIG. 8 shows another embodiment of the present invention, this one rotatable for use with rotary spindles having internal bar stock capability, for example, on automatic turning or grinding machines. In this case, the action of the actuator, which may be the opening or closing of a collet or chuck, does not occur at the end of the actuator toward which the piston travels, as was the case with actuator 10 shown on FIGS. 1–3. Here, the action of the actuator occurs at the end of the actuator opposite the direction of piston travel; however, as is described below, the principal of operation is the same as for the embodiment shown on FIGS. 1–3.

The actuator of FIG. 8, generally indicated by the reference numeral 100, includes a plunger 112 to which, by means of threaded retainer 114, is fixedly attached draw tube 116. Draw tube is disposed centrally of actuator 100 and is adapted for axial back-and-forth movement relative thereto. Such movement may actuate a collet or chuck mechanisms (not shown) mounted at the front of spindle 121 to which actuator 100 is attached.

Plunger 112 is closely fitted for back-and-forth axial movement within a pilot cartridge 118 which is fixedly attached to a cylinder housing 120. Cylinder housing 120 is closed at one end by end piece 126 which is fixedly attached to the rear end of a spindle 121 by means of collar 123 and threaded retainer 125. Closely disposed within cylinder housing 120 is piston 122 adapted for vack-and-forth axial movement within the cylinder housing. Fixedly attached to piston 122 is piston sleeve 124 which is disposed centrally of pilot cartridge 118. Cylinder housing 120 is further sealed by sealing means 128, 129, and 130, disposed as shown. Sealing means 128–130 may be O-rings, as shown, or may be any other type of sealing means known in the art, such as packing or piston rings. Fluid communication with the face side 132 of piston 122 is through port 134 which communicates with rotary air supply 138. Fluid communication means (not shown) are also provided between rotary air supply 138 and back side 136 of piston 122.

Completing the major elements of actuator 110 are: a cage 140, disposed for close-fitting independent axial movement relative to piston sleeve 124 and pilot cartridge 118; thrust ring 142, disposed for close-fitting independent axial movement relative to piston sleeve 124, pilot cartridge 118, and cage 140; rollers 144, disposed for engaging motion relative to sloped surfaces 146, 148, and 150, respectively, of piston sleeve 124, plunger 112, and thrust ring 142; and locking cone-washers 152, disposed between cage 140 and thrust ring 142. While, theoretically, only one roller 140 need be employed, it is preferable that at least three such rollers be employed, disposed at 120-degree intervals about piston 124, for force equilibrium.

At least one, and preferably at least three, shoulder screws, as at 154, and their associated preloaded compression springs 156 are provided to provide unitary movement of piston sleeve 124 and plunger 112 while those elements, are moving from their "open" positions (not shown) to their "clamped" positions shown on FIG. 8 and to allow relative axial movement between the piston sleeve and the plunger for actuation of the force-multiplying means described below. At least one, and preferably at least three, shoulder screws 158 with their associated compression springs 160 are provided as shown to connect together plunger 112 and cage 140 in abutting relationship to allow their unitary movement together with thrust ring 142 and rollers 144 when actuator 110 is in its "open" position (not shown) and to allow relative movement apart of the plunger and the cage, as shown on FIG. 8.

Operation of actuator 100 of FIG. 8 is essentially the same as the operation of actuator 10 of FIGS. 1–3 described above, to which description reference should be made, the principal difference being that, with actuator 100, force transmission to the workpiece is through draw tube 116, while, with actuator 10, force transmission to the workpiece is through clamping plunger 12. An additional feature of actuator 100 is that the centrifugal force occurring in rollers 144 at spindle speeds tends to increase the gripping force, thus allowing reduction in the diameter of cylinder housing 120 and/or reduction in fluid supply pressure.

Comments above with respect to variations of the wedging mechanism and locking means are applicable here as well.

FIG. 8 also shows a variation of the present invention which provides, in essence, what is a supplementary cylinder housing 162 formed between cylinder housing 120, piston sleeve 124, cage 140, and the inner wall of pilot cartridge 118 and isolated by sealing means 130, 164, and 166, as shown. The "piston", in this case, is cage 140. Supplementary cylinder housing 162 would be provided with inlet and outlet fluid ports (not shown). Having cage 140 act as a supplementary piston has several advantages. First, faster movement of the actuator to workpiece engagement may be achieved. Second, cage 140 may be used alone for preliminary clamping while proper positioning and true running of the workpiece is verified and corrected before gripping with force-multiplication. Third, applying pressure to supplementary cylinder housing 162 augments the locking means. Fourth, mechanical locking means may be eliminated altogether if a liquid is available to introduce into supplementary cylinder housing 162. In the latter case, cage 140 and thrust ring 142 could comprise a single element, with the incompressibility of the liquid preventing movement of the single element away from rollers 144. The liquid need not be supplied at a high pressure: any available liquid, such as a coolant, being satisfactory.

Materials of construction for the present invention, methods of fabrication, and tolerances are well known in the art and may be any conventional ones suitable for the particular application.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A mechanism to actuate workpiece engagement means to engage a workpiece, comprising:

(a) first actuator means to move said engagement means a selected distance to cause engagement of said workpiece by said engagement means and engagement of said workpiece with a first force;

(b) second actuator means cooperating with said first actuator means to cause engagement of said workpiece by said engagement means with a second force after engagement of said engagement means with said workpiece, said second force being a multiple of said first force; and (c) locking means cooperating with said second actuator means to maintain said second force, said locking means being selected from the group consisting of locking cone washers, a slotted bushing having internal tapers, and a resilient ring.

2. A mechanism, as defined in claim 1, wherein, after said engagement means engages said workpiece, further movement of said first actuator means provides input force to said second actuator means.

3. A mechanism, as defined in claim 1, wherein said first actuator means comprises fluid-operated piston means.

4. A mechanism, as defined in claim 3, wherein said piston means, comprises:

(a) housing means;

(b) piston means disposed within said housing means for back-and-forth relative axial movement therewith and having first and second sides;

(c) means to introduce pressurized fluid into said housing means on said first side of said piston means and to relieve fluid pressure on said second side of said piston means; and (d) piston extension means connected to said piston and adapted to cause movement of said workpiece engagement means to said workpiece when said pressurized fluid is introduced into said housing means on said first side of said piston means and said fluid pressure on said second side of said piston means is relieved.

5. A mechanism, as defined in claim 4, wherein said wedging means comprises:

(a) a first sloped surface formed on said piston extension means;

(b) a member to transmit said axial movement and said clamping force to said workpiece engagement means;

(c) a second sloped surface formed on said member, said second surface forming a first V-shaped trough with said first surface; and (d) movable means slidingly disposed between said first and second sloped surfaces, such that further movement of said piston extension after said engagement means has engaged said workpiece will force said movable means away from the apex of said first V-shaped trough, thus causing said clamping with increased force.

6. A mechanism, as defined in claim 5, further comprising:

(a) thrust means;

(b) a third sloped surface formed on said thrust means, said third sloped surface forming a second V-shaped trough with said first sloped surface and forming a third V-shaped trough with said second sloped surface;

(c) said movable means slidingly disposed between said surfaces forming said first, second, and third V-shaped troughs, such that further movement of said piston extension after said engagement means has engaged said workpiece will force said movable means toward the apex of said second and third V-shaped troughs; and (d) said locking means to prevent substantial movement of said thrust means away from said member when said movable means is forced toward said apex of said second and third V-shaped troughs.

7. A mechanism, as defined in claim 1, wherein said second actuator means comprises wedging means.

8. A mechanism to move workpiece engagement means a selected distance to engage a workpiece and to provide force multiplication to said engagement means after engaging said workpiece, comprising:

(a) plunger means;

(b) a pilot cartridge within which said plunger means is closely fitted for back-and-forth axial movement therewith;

(c) a cylinder housing fixedly attached to said pilot cartridge and in axial alignment therewith;

(d) a piston, having first and second faces, closely disposed within said cylinder housing and adapted for back-and-forth axial movement therewith;

(e) a piston rod disposed centrally of said pilot cartridge, which said piston rod serves as an extension of said piston;

(f) first and second fluid communication means formed in said cylinder housing for fluid communication, respectively, with said first and second faces of said piston;

(g) cage means, disposed for close-fitting independent axial movement relative to said piston rod and said pilot cartridge;

(h) thrust ring means, disposed for close-fitting independent axial movement relative to said piston rod, said pilot cartridge, and said cage means;

(i) a first sloped surface on said piston rod;

(j) a second sloped surface on said plunger means;

(k) a third sloped surface on said thrust ring means;

(l) said first, second, and third sloped surfaces defining V-shaped troughs between said first and second sloped surfaces, between said second and third sloped surfaces, and between said third and first sloped surfaces;

(m) rollers disposed for engaging motion relative to said first, second, and third sloped surfaces; and (n) self-locking means disposed between a surface of said cage means and a surface of said thrust ring means, said self-locking means holding said thrust ring means stationary with respect to said plunger means when said mechanism is providing said force multiplication.

9. A mechanism, as defined in claim 8, wherein said plunger means is adapted to engage said workpiece.

10. A mechanism, as defined in claim 8, wherein said plunger means is operatively connected to draw tube means, which drawtube means causes actuation of said workpiece engagement means.

11. A mechanism, as defined in claim 8 wherein said self-locking means comprises cone locking-washers which engage the inner surface of said pilot cartridge and provide cylinder lockout when said mechanism is providing said force multiplication.

12. A mechanism, as defined in claim 8, further comprising a supplementary cylinder housing defined by said pilot cartridge, said cylinder housing, said cage means, and a piston sleeve disposed centrally of said pilot cartridge.

13. A mechanism to actuate workpiece engagement means to engage a workpiece, comprising:

(a) first actuator means to move said engagement means a selected distance to cause engagement of said workpiece by said engagement means and engagement of said workpiece with a first force; said first actuator means comprising:
  (i) housing means;
  (ii) fluid-operated piston means disposed within said housing means for back-and-forth relative axial movement therewith and having first and second sides;
  (iii) means to introduce pressurized fluid into said housing means on said first side of said piston means and to relieve fluid pressure on said second side of said piston means; and
  (iv) piston extension means connected to said piston and adapted to cause movement of said workpiece engagement means to said workpiece when said pressurized fluid is introduced into said housing means on said first side of said piston means and said fluid pressure on said second side of said piston means is relieved;

(b) second actuator means cooperating with said first actuator means to cause engagement of said workpiece by said engagement means with a second force after engagement of said engagement means with said workpiece, said second force being a multiple of said first force, said second actuator means comprising:
  (i) a first sloped surface formed on said piston extension means;
  (ii) a member to transmit said axial movement and said clamping force to said workpiece engagement means;
  (iii) a second sloped surface formed on said member, said second surface forming a first V-shaped trough with said first surface; and
  (iv) movable means slidingly disposed between said first and second sloped surfaces, such that further movement of said piston extension after said engagement means has engaged said workpiece will force said movable means away from the apex of said first V-shaped trough, thus causing said clamping with increased force;

(c) thrust means;

(d) a third sloped surface formed on said thrust means, said third sloped surface forming a second V-shaped trough with said first sloped surface and forming a third V-shaped trough with said second sloped surface;

(e) said movable means slidingly disposed between said surfaces forming said first, second, and third V-shaped troughs, such that further movement of said piston extension after said engagement means has engaged said workpiece will force said movable means toward the apex of said second and third V-shaped troughs; and (f) locking means to prevent substantial movement of said thrust means away from said member when said movable means is forced toward said apex of said second and third V-shaped troughs, said locking means being selected from the group consisting of locking cone washers, a slotted bushing having internal diameter tapers, and a resilient ring.

* * * * *